United States Patent
Prasad et al.

(10) Patent No.: US 12,380,289 B2
(45) Date of Patent: Aug. 5, 2025

(54) SYSTEM AND METHOD FOR SPEECH RECOGNITION USING MACHINE TRANSLITERATION AND TRANSFER LEARNING

(71) Applicant: TALENT UNLIMITED ONLINE SERVICES PRIVATE LIMITED, Delhi (IN)

(72) Inventors: Rahul Prasad, Gurugram (IN); Ankit Prasad, Gurugram (IN); Abhishek Sharma, Noida (IN)

(73) Assignee: TALENT UNLIMITED ONLINE SERVICES PRIVATE LIMITED, Delhi (IN)

( * ) Notice: Subject to any disclaimer, the term of this patent is extended or adjusted under 35 U.S.C. 154(b) by 352 days.

(21) Appl. No.: 18/073,555

(22) Filed: Dec. 1, 2022

(65) Prior Publication Data

US 2023/0169282 A1 Jun. 1, 2023

(30) Foreign Application Priority Data

Dec. 1, 2021 (IN) .............................. 202111055740

(51) Int. Cl.
*G10L 15/06* (2013.01)
*G06F 40/166* (2020.01)
(Continued)

(52) U.S. Cl.
CPC ............ *G06F 40/58* (2020.01); *G06F 40/166* (2020.01); *G10L 15/063* (2013.01); *G10L 15/22* (2013.01); *G10L 15/26* (2013.01); *G10L 15/30* (2013.01)

(58) Field of Classification Search
CPC ..... G06F 40/58; G06F 40/166; G10L 15/063; G10L 15/22; G10L 15/26; G10L 15/30
See application file for complete search history.

(56) References Cited

U.S. PATENT DOCUMENTS

2017/0206903 A1* 7/2017 Kim ................. G10L 15/30
2018/0136862 A1* 5/2018 Rusenas ................. G06F 3/067
(Continued)

OTHER PUBLICATIONS

Joshi et al., Transfer Learning Approaches for Streaming End-to-End Speech Recognition System, 2020, arXiv, whole document (Year: 2021).*

(Continued)

*Primary Examiner* — Sonia L Gay
(74) *Attorney, Agent, or Firm* — Joy S Goudie (57) ABSTRACT

A method for converting speech in one of a plurality of input languages into text using machine transliteration and transfer learning is disclosed. The method includes a training stage. The training stage includes receiving a training set of a plurality of audio files and an input text corresponding to the audio input in any input language using the speech recognition engine; transliterating the training set to transform the input text into transliterated text that includes characters of a base language and training acoustic model with the plurality of audio files and corresponding transliterated text using transfer learning. The method further includes an inference stage. The inference stage includes performing decoding on output of the trained acoustic model to generate text includes characters of the base language at inference and transliterating the generated text to output text includes characters in input language using reverse transliteration.

13 Claims, 3 Drawing Sheets

(51) Int. Cl.
*G06F 40/58* (2020.01)
*G10L 15/22* (2006.01)
*G10L 15/26* (2006.01)
*G10L 15/30* (2013.01)

(56) References Cited

U.S. PATENT DOCUMENTS

| | | | |
|---|---|---|---|
| 2020/0027444 A1* | 1/2020 | Prabhavalkar | G10L 15/02 |
| 2021/0233510 A1* | 7/2021 | Datta | G10L 15/063 |
| 2022/0138453 A1* | 5/2022 | Lee | G06V 40/30 |
| | | | 382/181 |
| 2022/0366898 A1* | 11/2022 | Qian | G10L 15/187 |

OTHER PUBLICATIONS

Li et al., SANTLR: Speech Annotation Toolkit for Low Resource Languages, 2019, arXiv, whole document (Year: 2019).*

Hidayatullah et al.l, Attention-based CNN-BILSTM for dialect identification on Javanese text , 2020, Kinetik, whole document (Year: 2020).*

Shukla et al., A Facebook Identical Data Detection and Deletion Algorithm, 2016, International Journal of Computer Science and Information Security, whole document (Year: 2016).*

Nair et al., English to Indian Language and Back Transliteration with Phonetic Transcription for Computational Linguistics Tools based on Conventional Transliteration Schemes, 2021, IEEE, whole document (Year: 2021).*

Kuchaiev, Jump-start Training for Speech recognition Models in Different Languages with NVIDIA NEMO 2020, NVIDIA Developer-Technical Blog, whole document (Year: 2020).*

* cited by examiner

SYSTEM AND METHOD FOR SPEECH RECOGNITION USING MACHINE TRANSLITERATION AND TRANSFER LEARNING

CROSS-REFERENCE TO RELATED APPLICATION

The embodiments herein claim the priority of the Indian Provisional Patent Application (PPA) with serial number IN 202111055740 filed on Dec. 1, 2021, with the title, "SYSTEM AND METHOD FOR SPEECH RECOGNITION USING MACHINE TRANSLITERATION AND TRANSFER LEARNING", and the content of which is included in its entirety as reference herein.

BACKGROUND

Technical Field

The present invention, in general, relates to speech recognition. More particularly, the present invention relates to a system and a method of machine transliteration and transfer learning. In specific, the present invention describes a system and a method for speech recognition using machine transliteration and transfer learning.

Description of the Related Art

Conventional speech-to-text (STT) or voice-to-text conversions for a plurality of input language require a plurality of acoustic models and language models. These conversions require training of multiple, different artificial intelligence (AI) models from scratch, which is time consuming. That is, conventional speech recognition methods require training of a plurality of acoustic models and use of a plurality of language models for STT conversions. In some implementations, all words that are not in the first script are transliterated into the first script. The existing methods include the process of accessing a set of data indicating language examples for a first script, wherein at least some of the language examples include words in the first script and words in one or more other scripts, the method transliterates at least portions of some of the language examples to the first script to generate a training data set having words transliterated into the first script.

Hence, there is a need for reducing the time required for training these models and using transfer learning to create acoustic model for any language using a single acoustic model for example, the acoustic model that is pre-trained on English data to transcribe a plurality of languages. Conventional sequence-to-sequence speech transcription and recognition models are based on recurrent neural network (RNN) models with complex deep neural network layers. Training these RNN models is time intensive and expensive to implement.

Hence, there is a long-felt need for a system and a method for converting speech in any input language into text using machine transliteration and transfer learning, while addressing the above-recited problems associated with the related art.

SUMMARY

This summary is provided to introduce a selection of concepts in a simplified form that are further disclosed in the detailed description. This summary is not intended to determine the scope of the claimed subject matter.

The present invention addresses the above-recited need for a system and a method for converting speech in one of a plurality of input languages, for example, Hindi, into text comprising, for example, Devanagari characters, using machine transliteration and transfer learning. The method disclosed herein employs an artificial intelligence (AI)-based speech recognition engine executable by at least one processor for converting speech in any input language into text using machine transliteration and transfer learning.

In an aspect a processor implemented method for converting speech in one of a plurality of input languages into text using machine transliteration and transfer learning is provided. The method includes a training stage. The training stage includes receiving a training set of a plurality of audio files and an input text corresponding to the audio input in any input language using the speech recognition engine. The training stage further includes transliterating the training set to transform the input text into transliterated text includes characters of a base language and training an acoustic model with the plurality of audio files and corresponding transliterated text using transfer learning. The method further includes an inference stage. The inference stage includes performing decoding on an output of the trained acoustic model to generate text includes characters of the base language and transliterating the generated text to output text includes characters in the input language using reverse transliteration.

According to an embodiment, transliterating includes transliterating languages using a speech recognition engine.

According to an embodiment, the method further includes sanitizing the data during the preparation of the data set using the speech recognition engine.

According to an embodiment, the sanitization includes removal of at least one of duplication of a plurality of audio files and corresponding transcript text and/or blanks in the text.

According to an embodiment, sanitization includes removing the audio transcript pairs, where audios or transcripts are repeated and keeping only one such pair selected randomly, and wherein repeated audios are identified using checksum. If plurality of audio transcript pairs is present with same transcript, only one such audio transcript pair is kept in the data. Sanitization also includes removing audio transcript pairs where audio is noisy. The noisy audio is detected by identifying audios which have too much noise either programmatically or manually.

According to an embodiment, the transliterating is the process of converting text of any language written in one script to another script.

According to an embodiment, the transliterating is achieved using a plurality of methodologies includes at least one of rule-based machine transliteration, Finite-state Transducers (FST) based transliteration, AI based transliteration, neural model-based transliteration, and mapping-based transliteration.

According to an embodiment, the rule-based transliteration is performed using a collection of rules stored on the disk in a keypair format and processed using python programming language to transform text in one script to another using defined rules.

According to an embodiment, the rules are one of subword based, even phrase based, and character based.

According to an embodiment, the rule-based machine transliteration includes executing the phrase-based replacements includes at least one of word based, sub-word based and character-based replacements and discarding the characters left from the initial script of the transcripts.

According to an embodiment, the trained acoustic models are used to perform speech-to-text conversion for a plurality of languages.

According to an embodiment, the speech recognition engine trains an acoustic model using transfer learning over pre-trained acoustic model of base language with the plurality of audio files and corresponding transliterated text in the base language characters using transfer learning.

According to an embodiment, the pre-trained acoustic model is trained on plurality of datasets of the base language.

According to an embodiment, the pre-trained acoustic model is trained on a plurality of datasets of the base language and wherein the model trained using transfer learning over pre-trained acoustic model learns optimally when the characters in the transcript are from the base language itself.

According to an embodiment, the transfer learning is a machine learning method which reuses a pre-trained acoustic model developed for converting speech in a base language as a starting point for training an acoustic model for converting speech in an input language.

According to an embodiment, the transfer learning is a technique of training machine learning models in which a pre-trained model or checkpoint is used to assign starting weights for model training.

According to an embodiment, a checkpoint is a collection of model weights which is read programmatically, and the weights are used as the starting model weights for the model to be trained.

According to an embodiment, the speech recognition engine executes either of the beam search decoding algorithm or other functionally equivalent decoding algorithm on the output of the trained acoustic model to increase the accuracy of the generated text which includes characters of the base language.

According to an embodiment, the beam search decoding is a method of extracting output sequence from ML models where instead of picking the individual output at each time step with either maximum score or probability given by ML model a plurality of alternatives is selected for output sequence at each timestep based on conditional probability.

According to an embodiment, the number of alternatives at each timestep is called beam width.

According to an embodiment, implementation is performed in python programming language and the output of acoustic model is used as the input to it in the case.

According to an embodiment, the probabilities which are returned by the acoustic model are used as the input to beam search decoding along with a language model to return a certain number of alternatives and the one with max conditional probability is picked.

In another aspect, a system for converting speech in one of a plurality of input languages into text using machine transliteration and transfer learning is provided. The system includes a memory unit including one or more executable modules and a processor configured to execute the one or more executable modules for converting speech in one of a plurality of input languages into text using machine transliteration and transfer learning. The one or more executable modules includes a data reception module that receives training set including a plurality of audio files and corresponding transcript texts in any input language. A data transformation module transforms the input text into transliterated text includes characters of a base language. A training module trains an acoustic model with the plurality of audio files and corresponding transliterated text. An inference module performs decoding on an output of the trained acoustic model to generate text includes characters of the base language. A database stores the plurality of audio files received as speech input for speech-to-text conversion and a corpus containing large datasets of curated and augmented texts.

According to an embodiment, the inference module is further configured to improve the accuracy of the generated text includes characters of the base language.

According to an embodiment, the inference module is further configured for receiving an audio file as input from the user, processing the input audio data through an acoustic model and generating output text in a base language character that is reverse transliterated to obtain text in the original input language characters through a pre-trained customized language model.

In one or more embodiments, related systems comprise circuitry and/or programming for effecting the present invention. In an embodiment, the circuitry and/or programming are any combination of hardware, software, and/or firmware configured to implement the present invention depending upon the design choices of a system designer. Also, in an embodiment, various structural elements are employed depending on the design choices of the system designer.

BRIEF DESCRIPTION OF THE DRAWINGS

The foregoing summary, as well as the following detailed description, is better understood when read in conjunction with the appended drawings. For illustrating the present invention, exemplary constructions of the present invention are shown in the drawings. However, the present invention is not limited to the specific methods and components disclosed herein. The description of a method step or a component referenced by a numeral in a drawing is applicable to the description of that method step or component shown by that same numeral in any subsequent drawing herein.

DETAILED DESCRIPTION OF THE DRAWINGS

The embodiments herein and the various features and advantageous de-tails thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

Various embodiments disclosed herein provide a method and a system for converting speech in one of a plurality of input languages into text using machine transliteration and transfer learning. The system and method disclosed herein uses the pre-trained English acoustic model for training and implementing speech recognition for any language in the world. The use of pre-trained acoustic models reduces the time required for training and developing the acoustic model. To use an acoustic model that is pre-trained on a Latin or English dataset, the present invention transliterates the input received in any input language into Latin or English characters, thereby reducing the training time substantially over training from scratch for a plurality of languages. The present invention precludes the need for training a plurality of acoustic models from scratch, as a single pre-trained English acoustic model is used as the starting point. Moreover, the use of a pre-trained acoustic model is computationally less expensive.

Figure 1:
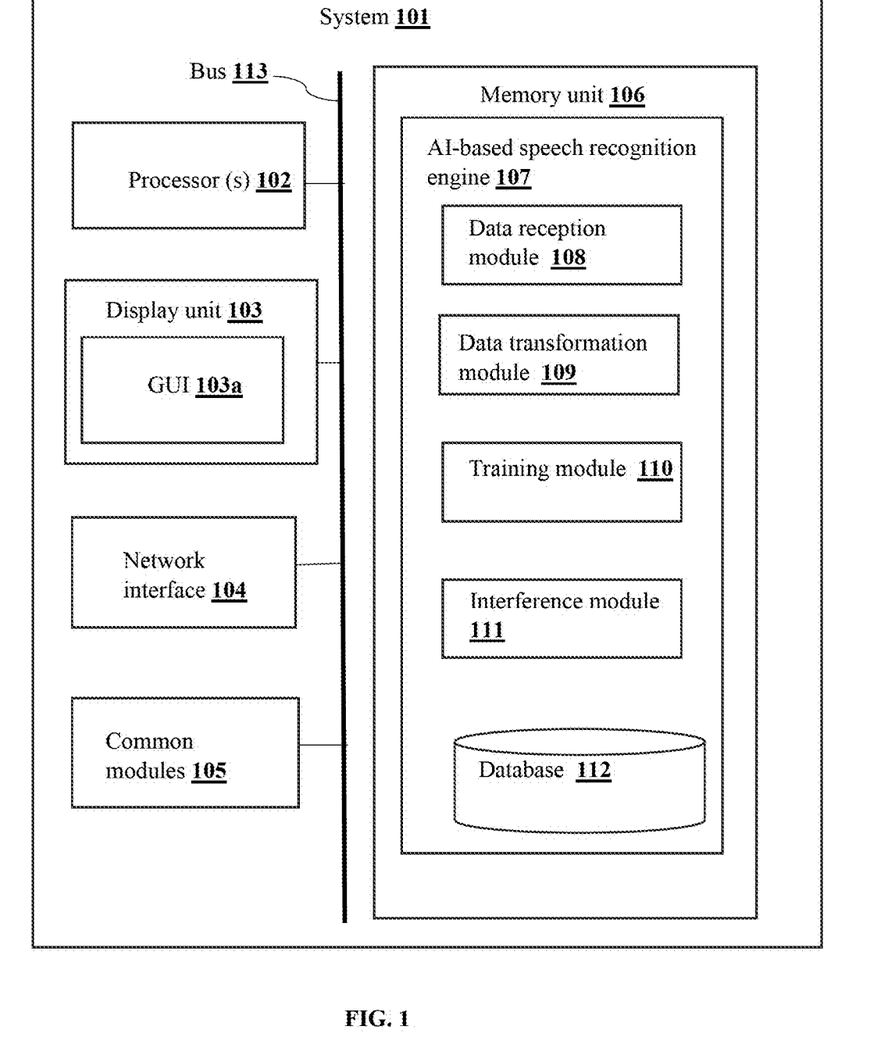
FIG. 1 illustrates an architectural block diagram of a system for converting speech in one of a plurality of input languages into text using machine transliteration and transfer learning, according to an embodiment of the present invention.

FIG. 1 illustrates an architectural block diagram of an exemplary implementation of a system 101 for converting speech in one of a plurality of input languages into text using machine transliteration and transfer learning, according to an embodiment of the present invention. In an embodiment, the system 101 includes a system 101 as exemplarily illustrated in FIG. 1. The system 101 may include a computer system programmable using high-level computer programming languages. The system 101 is an electronic device, for example, one or more of a personal computer, a tablet computing device, a mobile computer, a mobile phone, a smart phone, a portable computing device, a laptop, a personal digital assistant, a wearable computing device such as smart glasses, a smart watch, etc., a touch centric device, a workstation, a client device, a server, a portable electronic device, a network enabled computing device, an interactive network enabled communication device, an image capture device, any other suitable computing equipment, combinations of multiple pieces of computing equipment, etc. In an embodiment, the speech recognition engine 107 is implemented in the system 101 using programmed and purposeful hardware. In an embodiment, the speech recognition engine 107 is a computer-embeddable system that converts speech in any input language into text using machine transliteration and transfer learning.

In an embodiment, the speech recognition engine 107 is accessible to users at inference, for example, through a broad spectrum of technologies and user devices such as smart phones, tablet computing devices, endpoint devices, etc., with access to a network, for example, a short-range network or a long-range network. The network is, for example, one of the internets, an intranet, a wired network, a wireless network, a network that implements Wi-Fi® of Wi-Fi Alliance Corporation, a mobile telecommunication network, etc., or a network formed from any combination of these networks.

As illustrated in FIG. 1, the system 101 comprises at least one processor 102 and a non-transitory, computer-readable storage medium, for example, a memory unit 106, for storing computer program instructions defined by modules, for example, 108, 109, 110, 111, etc., of the speech recognition engine 107. In an embodiment, the modules, for example, 108, 109, 110, 111, 112, and the like, of the speech recognition engine 107 are stored in the memory unit 106 as illustrated in FIG. 1. The processor 102 is operably and communicatively coupled to the memory unit 106 for executing the computer program instructions defined by the modules, for example, 108, 109, 110, 111, etc., of the speech recognition engine 107. The processor 102 refers to any one or more microprocessors, central processing unit (CPU) devices, finite state machines, computers, microcontrollers, digital signal processors, logic, a logic device, an application specific integrated circuit (ASIC), a field-programmable gate array (FPGA), a chip, etc., or any combination thereof, capable of executing computer programs or a series of commands, instructions, or state transitions. The speech recognition engine 107 is not limited to employing the processor 102. In an embodiment, the speech recognition engine 107 employs one or more controllers or microcontrollers.

As illustrated in FIG. 1, the system 101 comprises a data bus 113, a display unit 103, a network interface 104, and common modules 105. The data bus 113 permits communications between the modules, for example, 102, 103, 104, 105, and 106. The display unit 103, via a graphical user interface (GUI) 103a, displays information, display interfaces, user interface elements such as checkboxes, input text fields, etc., for example, for allowing a user to invoke and execute the speech recognition engine 107 at the inference stage, where the user device 101 receives the audio input from the user for speech-to-text conversion, and perform input actions for triggering various functions to transcribe the audio input into text of the base language.

The network interface 104 enables connection of the speech recognition engine 107 to the network. The network interface 104 is, for example, one or more of infrared interfaces, interfaces implementing Wi-Fi® of Wi-Fi Alliance Corporation, universal serial bus interfaces, FireWire® interfaces of Apple Inc., interfaces based on transmission control protocol/internet protocol, interfaces based on wireless communications technology such as satellite technology, radio frequency technology, near field communication, etc. The common modules 105 of the system 101 comprise, for example, input/output (I/O) controllers, input devices, output devices, fixed media drives such as hard drives, removable media drives for receiving removable media, etc. Computer applications and programs are used for operating the speech recognition engine 107. The programs are loaded onto fixed media drives and into the memory unit 106 via the removable media drives. In an embodiment, the computer applications and programs are loaded into the memory unit 106 directly via the network.

In an embodiment, the speech recognition engine 107 comprises modules defining computer program instructions, which when executed by the processor 102, cause the processor 102 to convert speech in any input language into text using machine transliteration and transfer learning training. In an embodiment, the modules of the speech recognition engine 107 comprise a data reception module 108, a data transformation module 109, a training module 110, an inference module 111, and a database 112. The database 112 stores, for example, audio files received as speech input for speech-to-text conversion and a corpus containing large datasets of curated and augmented texts. The data reception module 108 receives training set of plurality of audio files and input text corresponding to the audio input in any language (for example Hindi) using the speech recognition engine. The data transformation module 109 transliterates the training set to transform the input text into transliterated text comprising characters of a base language. The data transformation module 109 transforms the input text into transliterated text comprising characters of a base language, for example, Latin or English, using any transliteration methodology, for example, rule-based machine transliteration, WFST based transliteration, AI-based machine transliteration, mapping-based transliteration, and the like.

In an embodiment, the training module 110 trains an acoustic model with the plurality of audio files and corresponding transliterated text based on, for example, transfer learning over pre-trained acoustic model in base language. The pre-trained acoustic model is trained on multiple datasets of the base language. The inference module 111 performs decoding, for example on an output of the trained acoustic model to generate text comprising characters of the base language, for example, Latin or English. In an embodiment, the inference module 111 improves the accuracy of the generated text comprising characters of the base language, for example, Latin or English, by using a pre-trained customized language model such as a pre-trained Hindi language model with Latin characters. The generated text is transliterated by the inference module 111 to output text comprising characters in the input language, for example, Devanagari characters, using reverse transliteration using any transliteration methodology, for example, rule-based machine transliteration, WFST based transliteration, AI-based machine transliteration, mapping-based transliteration, etc. Further, the inference module 111 executes the inference stage disclosed in the detailed description of FIG. 2, where the inference module 111 receives an audio file as input from the user, processes the input audio data through the acoustic model, and in an embodiment, through the pre-trained customized language model, and generates output text in characters of a base language, which is reverse transliterated to obtain text in the original input language.

The data reception module 108, the data transformation module 109, the training module 110, and the inference module 111 are disclosed above as software executed by the processor 102. In an embodiment, the modules, for example, 108, 109, 110, and 111 of the speech recognition engine 107 are implemented completely in hardware.

In another embodiment, the modules, 108, 109, 110, and 111 of the speech recognition engine 107 are implemented by logic circuits to carry out their respective functions disclosed above. In another embodiment, the speech recognition engine 107 is also implemented as a combination of hardware and software including one or more processors, for example, 102 that are used to implement the modules, for example, 108, 109, 110, and 111 of the speech recognition engine 107. The processor 102 retrieves instructions defined by the speech reception module 108, the data transformation module 109, the training module 110, and the inference module 111 from the memory unit 106 for performing respective functions disclosed above. The non-transitory, computer-readable storage medium disclosed herein stores computer program instructions executable by the processor 102 for converting speech in any input language into text using machine transliteration and transfer learning.

Figure 2:
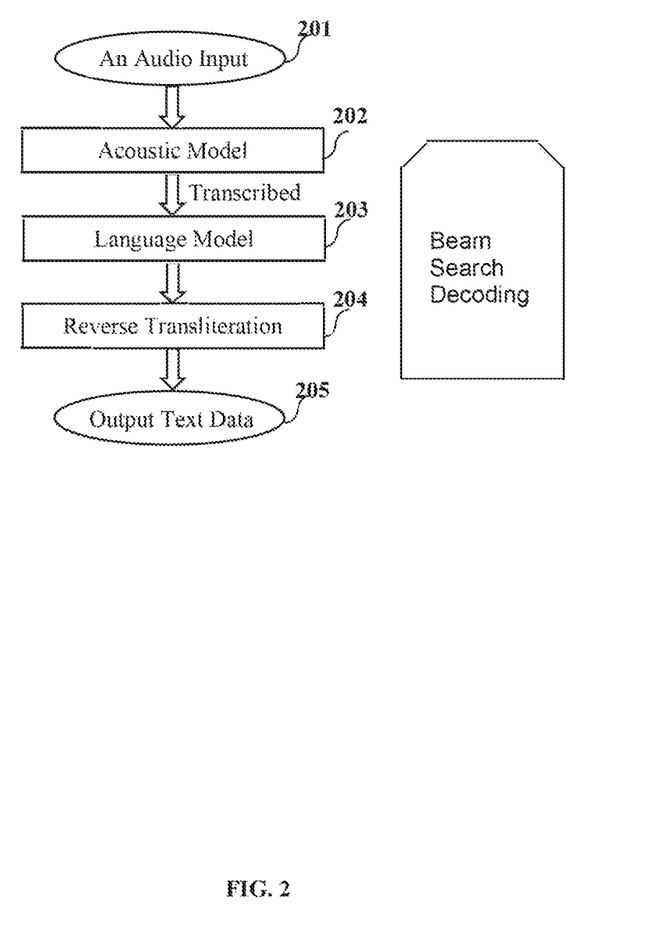
FIG. 2 illustrates a high-level flowchart showing a process flow for converting an audio input in any input language into text at an inference stage, according to an embodiment of the present invention.

FIG. 2 illustrates a high-level flowchart showing a process flow for converting an audio input in any input language into text at an inference stage, according to an embodiment of the present invention. As illustrated in FIG. 2, the speech recognition engine receives the audio input 201 and applies the audio input 201 to the acoustic model 202, which transcribes text in base language characters. In one embodiment, the speech recognition engine improves the accuracy of the transcribed text by using the pre-trained customized language model 203 while decoding. In an additional embodiment, the speech recognition engine is configured to perform beam search decoding to increase the accuracy of the generated transcribed text. At the inference stage 204, the speech recognition engine performs reverse transliteration to generate output text data 205 in the original input language.

Figure 3:
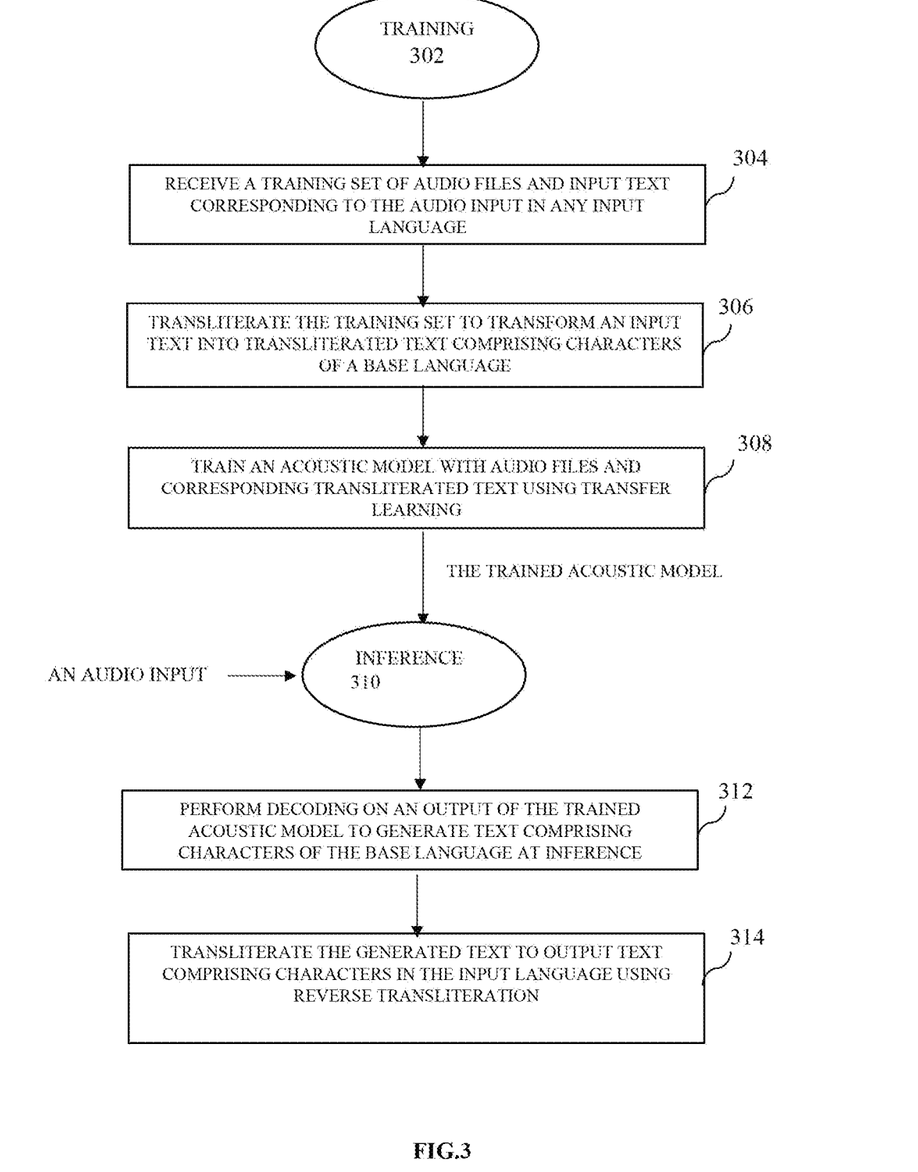
FIG. 3 illustrates a flowchart of a method for converting speech in one of a plurality of input languages into text using machine transliteration and transfer learning, according to an embodiment of the present invention.

FIG. 3 illustrates a flowchart of a method for converting speech in one of a plurality of input languages into text using machine transliteration and transfer learning, according to an embodiment of the present invention. The method disclosed herein employs an artificial intelligence (AI)-based speech recognition engine executable by at least one processor for converting speech in an input language into text. For purposes of illustration, the detailed description refers to a speech or audio input in an input language, for example, Hindi, being converted into text comprising Devanagari characters; however, the scope of the method and the system disclosed herein is not limited to the input language being Hindi but may be extended to include any other language. The speech recognition engine is configured to transliterate text in any input language to text comprising characters of a base language. In one embodiment, the speech recognition engine is configured to transliterate text in any input language to text comprising characters of Latin or English language.

In the method disclosed herein, at step 302 training stage begins. At step 304, a speech recognition engine receives a training set including pairs of audio files and transcript text (or input text) corresponding to the audio files in any input language, for example, Hindi. The input text comprises characters of the input language, for example, Devanagari characters. At step 306, the speech recognition engine transliterates the transcript text into transliterated text comprising characters of a base language, for example, Latin or English, using any transliteration methodology, for example, rule-based machine transliteration, WFST based transliteration, AI-based machine transliteration, mapping-based transliteration, and the like.

In an embodiment, instead of a phonetic language, the speech recognition engine is configured to transliterate graphical languages, for example, Mandarin, into similar sounding words or characters. In one embodiment, instead of transliteration into Latin or English characters, the speech recognition engine is configured to transliterate into characters of any other base language and train an AI model over the base language's pre-trained acoustic model, thereby providing ample possibilities to do transfer learning over pre-trained acoustic models of various languages and then using the trained acoustic models to perform speech-to-text conversion for a plurality of languages. In one embodiment, said any other language may be a language other than the graphical languages to train the pre-trained acoustic models in various languages and then using those trained acoustic models to perform speech-to-text conversion for a plurality of languages.

At step 308, the speech recognition engine trains an acoustic model using transfer learning over pre-trained acoustic model of base language with audio files and corresponding transliterated text in the base language characters using transfer learning. The pre-trained acoustic model is trained on multiple datasets of the base language. For example, the acoustic model is pre-trained on Latin characters in English language. Since the pre-trained acoustic model is trained over Latin characters or English alphabets, in an example, the speech recognition engine performs the above-mentioned machine transliteration for converting Devanagari characters into Latin characters or English alphabets to allow training of the acoustic model using transfer learning. For example, when the speech recognition engine receives an audio clip and a transcription of the audio clip recorded in Devanagari characters such as क्या कर रहे हैं, the speech recognition engine converts the Devanagari transcription into Latin characters or English alphabets "Kya kar rahe ho" using any method of transliteration, thereby allowing transfer learning over the pre-trained Latin or English-based acoustic model with the transliterated Latin or English character transcripts and corresponding Hindi audios. In one embodiment, the speech recognition engine is configured to sanitize the data while during the preparation of the data set. The data sanitization includes removal of at least one of duplication of audio files and corresponding transcript text or blanks in the text. In an embodiment, the data sanitization involves removing at least one of: duplicate audios, duplicate transcript, and noisy audio. Any audios which are repeated are removed by using checksum to identify same audios. If there are multiple audios with same transcript only one of them is kept in the data. Audios which have too much noise are identified either programmatically or manually and exclude them from the data. In some embodiments, the data sanitization may include any kind of manipulation to train set to improve results.

In the method disclosed herein, the acoustic model training uses a pre-trained acoustic model of base language for multiple other input languages, thereby reducing training time. The pre-trained acoustic model learns optimally when exposed to its own base language characters. In one embodiment, the acoustic model is a standardized model that is pre-trained on Latin or English characters and during transfer learning it learns optimally when exposed to text comprising characters of the Latin or English language, thereby increasing the accuracy of training. Transfer learning is a machine learning method that reuses a pre-trained acoustic model developed for converting speech in a base language, for example, Latin or English, into text, as a starting point for training an acoustic model for converting speech in an input language, for example, Hindi, into text. Transfer learning is a technique of training machine learning models in which a pre-trained model or checkpoint is used to assign starting weights for model training. A checkpoint is a collection of model weights which is read programmatically, and these weights are then used as the starting model weights for the model we are looking to train.

At step 310, inference is performed. At step 312, the speech recognition engine receives an audio input and passes the audio input through the trained acoustic model and then performs decoding on the output of the trained acoustic model to generate text comprising characters of the base language, for example, Latin or English. In an embodiment, the speech recognition engine additionally executes the beam search decoding algorithm or any other functionally equivalent decoding algorithm on the output of the trained acoustic model to increase the accuracy of the generated text that comprises characters of the base language, for example, Latin or English. The beam search decoding is a method of extracting output sequence from ML models where instead of picking the individual output at each time step with maximum score or probability given by ML model the system selects multiple alternatives for output sequence at each timestep based on conditional probability. The number of alternatives at each timestep is called beam width. The implementation is performed in python programming language and the output of acoustic model is used as the input to it in this case. The probabilities which are returned by the acoustic model are used as the input to beam search decoding along with a language model to return a certain number of alternatives and the one with max conditional probability is picked. In an embodiment, the speech recognition engine improves the inference accuracy of the generated text comprising characters of the base language, for example, Latin or English, by using a pre-trained customized language model, for example, pre-trained hindi customized English character language model.

At step 314, the speech recognition engine then transliterates the generated text of input language in the base language characters, for example English or Latin, to output text comprising characters in the input language, for example, Devanagari characters, using reverse transliteration using any transliteration methodology. For example, rule-based machine transliteration, WFST based transliteration, AI-based machine transliteration, mapping-based transliteration, etc. A detailed description describing a flow of converting an audio input in any input language into text at an inference stage from a user perspective through a user device is described in FIG. 2. The transliteration is the process of converting text of any language written in one script to another script. There can be multiple methodologies to achieve the same, for example rule-based machine transliteration, FST based transliteration, mapping-based transliteration, and the like. Rule-based transliteration system is a collection of rules stored on the disk in a keypair format and processed using python programming language to transform text in one script to another using defined rules. These rules can be sub-word based or even phrase based, or character based. First, the phrase-based replacements are executed and subsequently the word-based replacements is executed and then sub-word based replacements is executed and after that the character-based replacements are executed. Any transcripts which still have some characters left from the initial script are discard-ed.

The present invention is based on an AI-based speech recognition engine for conversion of speech-to-text or voice-to-text. The present invention transliterates any language received as multiple language character input into characters of a base language, for example, Latin characters, and uses the Latin characters transcripts along with the audios for training AI models for speech recognition. The present invention transcribes speech-to-text for any language in the world, thereby providing a convenient conversational platform that makes communication effortless. The present invention performs pre-processing in the form of machine transliteration of characters of any input language, for example, Devanagari characters, into Latin characters, on the training set before training the acoustic models. The present invention then performs training of the acoustic model in characters of a base language, for example, Latin or English characters, using transfer learning on a pre-trained English acoustic model.

The transcription from the trained Latin or English-based acoustic model is in Latin or English characters, which are then converted into Devanagari characters using reverse transliteration. The present invention uses the pre-trained English acoustic model for training and implementing speech recognition for any language in the world. The use of pre-trained acoustic models reduces the time required for training and developing the acoustic model. To use an acoustic model that is pre-trained on a Latin or English dataset, the present invention transliterates the training set transcripts in any input language into Latin or English characters, thereby reducing the training time over training from scratch for a plurality of languages. The present invention precludes the need for training a plurality of acoustic models from scratch, as a single pre-trained English acoustic model is used as the starting point. Moreover, the use of a pre-trained acoustic model is computationally less expensive.

The present invention has multiple applications involving speech-to-text or voice-to-text conversations in Hindi, other Indic languages, or any other language spoken in the world. The present invention can be used by third parties, research industries, firms or academic institutions working on speech recognition, businesses requiring data-driven strategies, research-based industries, software sectors, cloud-based companies, AI-based conversation media entities, etc. The present invention precludes the need for investing substantial amounts of money, time, and human resources on building AI models for speech recognition for multiple languages.

The foregoing examples and illustrative implementations of various embodiments have been provided merely for explanation and are in no way to be construed as limiting the present invention. While the present invention has been described with reference to various embodiments, illustrative implementations, drawings, and techniques, it is understood that the words, which have been used herein, are words of description and illustration, rather than words of limitation. Furthermore, although the present invention has been described herein with reference to particular means, materials, embodiments, techniques, and implementations, the present invention is not intended to be limited to the particulars disclosed herein; rather, the present invention extends to all functionally equivalent structures, methods and uses, such as are within the scope of the appended claims. It will be understood by those skilled in the art, having the benefit of the teachings of this specification that the present invention is capable of modifications and other embodiments may be affected and changes may be made thereto, without de-parting from the scope and spirit of the present invention.

What is claimed is:

1. A processor implemented method for converting speech in one of a plurality of input languages into text using machine transliteration and transfer learning, the method comprising steps of:
   providing a training stage comprises:
   receiving a training set of a plurality of audio files and an input text corresponding to an audio input in any input language using a speech recognition engine;
   transliterating the training set to transform the input text into transliterated text comprising characters of a base language; and
   training an acoustic model with the plurality of audio files and corresponding transliterated text using the transfer learning; and
   providing an inference stage;
   performing decoding on an output of the trained acoustic model to generate text comprising characters of the base language at the inference stage; and
   transliterating the generated text to output text comprising characters in the input language using reverse transliteration, wherein transliterating comprises transliterating using a speech recognition engine, wherein the transliterating is a process of converting text of any language written in one script to another script, wherein the transliterating is achieved using a plurality of methodologies comprising one of a rule-based machine transliteration, Finite-state Transducers (FST) based transliteration, AI based transliteration, Neural model-based transliteration, or mapping-based transliteration, wherein the rule-based transliteration is performed using a collection of rules stored on a disk in a keypair format and processed using python programming language to transform text in one script to another using defined rules, wherein the defined rules is one of sub-word based, word based, even phrase based, and character based, wherein the rule-based machine transliteration comprises:
   executing phrase-based replacements comprising at least one of word based, sub-word based, and character-based replacements; and
   discarding characters left from an initial script of transcripts.

2. The processor implemented method of claim 1, further comprising sanitizing data during preparation of data set using the speech recognition engine, wherein the sanitization comprises removal of at least one of duplication of the plurality of audio files and corresponding transcript text and/or blanks in the text.

3. The processor implemented method of claim 1, wherein sanitization comprises:
   removing audio transcript pairs, where audios or transcripts are repeated and keeping only one such pair selected randomly, and repeated audios are identified using checksum;
   removing the audio script pairs if a plurality of audio transcript pairs is present with same transcript by keeping only one such audio transcript pair is kept in data; and
   removing audio transcript pair where, audio is noisy, wherein noisy audio is detected by identifying audios which have too much noise either programmatically or manually.

4. The processor implemented method of claim 1, wherein the trained acoustic model is used to perform speech-to-text conversion for a plurality of languages.

5. The processor implemented method of claim 1, wherein the speech recognition engine trains the acoustic model using the transfer learning over a pre-trained acoustic model of the base language with the plurality of audio files and the corresponding transliterated text in the base language characters using the transfer learning.

6. The processor implemented method of claim 5, wherein the pre-trained acoustic model is trained on plurality of datasets of the base language, and wherein the pre-trained acoustic model trained using transfer learning over pre-trained acoustic model learns optimally when the characters in the transcript are from the base language itself.

7. The processor implemented method of claim 1, wherein the transfer learning is a machine learning method which reuses a pre-trained acoustic model developed for converting speech in a base language as a starting point for training the acoustic model for converting speech in an input language.

8. The processor implemented method of claim 7, wherein the transfer learning is a technique of training machine learning models in which a pre-trained model or a checkpoint is used to assign starting weights for model training.

9. The processor implemented method of claim 8, wherein the checkpoint is a collection of model weights which is read programmatically, and the model weights are used as starting model weights for the model to be trained.

10. The processor implemented method of claim 1, wherein the speech recognition engine executes either of a beam search decoding algorithm or other functionally equivalent decoding algorithm on output of the trained acoustic model to increase an accuracy of the generated text which comprises characters of the base language, wherein the beam search decoding algorithm is a method of extracting output sequence from Machine Learning (ML) models where instead of picking individual output at each time step with either maximum score or probability given by ML model a plurality of alternatives is selected for output sequence at each timestep based on conditional probability, wherein a number of alternatives at each timestep is called beam width, wherein the output of the acoustic model is used as the input to it in the case.

11. The processor implemented method of claim 10, wherein probabilities which are returned by the acoustic model are used as the input to the beam search decoding algorithm along with a language model to return a certain number of alternatives and the one with max conditional probability are picked.

12. The processor implemented method of claim 1, wherein the speech recognition engine transliterates the generated text of input language in the base language characters, to output text comprising characters in the input language, using reverse transliteration using any transliteration methodology.

13. A system for converting speech in one of a plurality of input languages into text using machine transliteration and transfer learning, the system comprising:
  a memory unit comprising an artificial intelligence (AI) based speech recognition engine comprising one or more executable modules; and
  a processor configured to execute the one or more executable modules for converting speech in one of the plurality of input languages into text using the machine transliteration and the transfer learning, the one or more executable modules comprising:
    a data reception module that receives training set including a plurality of audio files and corresponding transcripted texts in any input language;
    a data transformation module that transforms the transcripted texts into transliterated text comprising characters of a base language;
    a training module that trains an acoustic model with the plurality of audio files and corresponding transliterated text;
    an inference module that performs decoding on an output of the trained acoustic model to generate text comprising characters of the base language; and
    a speech recognition engine that transliterates the generated text to output text comprising characters in the input language using reverse transliteration, wherein the transliterating is a process of converting text of any language written in one script to another script, wherein the transliterating is achieved using a plurality of methodologies comprising one of a rule-based machine transliteration, Finite-state Transducers (FST) based transliteration, AI based transliteration, Neural model-based transliteration, or mapping-based transliteration, wherein the rule-based transliteration is performed using a collection of rules stored on a disk in a keypair format and processed using python programming language to transform text in one script to another using defined rules, wherein the defined rules is one of sub-word based, word based, even phrase based, and character based, wherein the rule-based machine transliteration comprises:
  executing phrase-based replacements comprising at least one of word based, sub-word based, and character-based replacements; and
  discarding characters left from an initial script of transcripts;
  a database that stores the plurality of audio files received as speech input for speech-to-text conversion and a corpus containing large datasets of curated and augmented texts wherein the inference module is configured to improve the accuracy of the generated text comprising characters of the base language through a pre-trained customized language model, wherein the inference module is configured for receiving an audio file as input from user;
  processing the input audio data through the acoustic model; and
  generating output text data in the base language, that is reverse transliterated to obtain text in the original input language characters.

* * * * *